(12) United States Patent
Novotny et al.

(10) Patent No.: US 7,231,587 B2
(45) Date of Patent: Jun. 12, 2007

(54) EMBEDDED PICTURE PSNR/CRC DATA IN COMPRESSED VIDEO BITSTREAM

(75) Inventors: Pavel Novotny, Waterloo (CA); Guy Cote, Elora (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 488 days.

(21) Appl. No.: 10/812,286

(22) Filed: Mar. 29, 2004

(65) Prior Publication Data

US 2005/0216815 A1 Sep. 29, 2005

(51) Int. Cl.
*H03M 13/09* (2006.01)
(52) U.S. Cl. .................................... 714/807
(58) Field of Classification Search ................. 714/807
See application file for complete search history.

(56) References Cited

U.S. PATENT DOCUMENTS

| | | | | |
|---|---|---|---|---|
| 4,852,084 A | * | 7/1989 | Verbiest et al. | 370/389 |
| 4,929,946 A | * | 5/1990 | O'Brien et al. | 341/87 |
| 5,038,221 A | * | 8/1991 | Dorren | 386/46 |
| 5,155,484 A | * | 10/1992 | Chambers, IV | 341/55 |
| 5,608,396 A | * | 3/1997 | Cheng et al. | 341/50 |
| 5,721,747 A | * | 2/1998 | Herrera Van Der Nood et al. | 714/799 |
| 5,768,528 A | * | 6/1998 | Stumm | 709/231 |
| 5,796,441 A | * | 8/1998 | Oshita | 348/476 |
| 5,900,865 A | * | 5/1999 | Howe | 345/572 |
| 6,519,733 B1 | * | 2/2003 | Har et al. | 714/758 |
| 6,571,362 B1 | * | 5/2003 | Crater et al. | 714/701 |
| 6,882,637 B1 | * | 4/2005 | Le et al. | 370/349 |

* cited by examiner

*Primary Examiner*—Stephen M. Baker
(74) *Attorney, Agent, or Firm*—Christopher P. Maiorana, P.C.

(57) ABSTRACT

A method for processing an input signal is disclosed. The method generally includes the steps of (A) extracting a compressed signal and a first checksum from the input signal, (B) generating a decompressed signal by decompressing the compressed signal, (C) calculating a second checksum for the decompressed signal and (D) generating a result by comparing the first checksum to the second checksum.

25 Claims, 6 Drawing Sheets

281

| BIT | 7 | 6 | 5 | 4 | 3 | 2 | 1 | 0 |
|---|---|---|---|---|---|---|---|---|
| VALUE | PSNR FORMAT | | | | CRC FORMAT | | | |

FIG. 6

EMBEDDED PICTURE PSNR/CRC DATA IN COMPRESSED VIDEO BITSTREAM

FIELD OF THE INVENTION

The present invention relates to signal codecs generally and, more particularly, to embedding peak signal-to-noise and/or cyclic redundancy check data in a compressed video bitstream.

BACKGROUND OF THE INVENTION

Conventional real-time video encoder systems are configured to produce video with requested parameters and visual quality. An encoded video bitstream generated by the real-time video encoder systems does not contain any numerical information about the video quality. Therefore, picture quality is checked visually after decoding the encoded video bitstream with a decoder system. The visual judgement is commonly not accurate enough to adjust some parameters used in encoding and/or decoding, thus resulting in a sub-optimal encoder setup.

A conventional standard-compliant decoder system should produce reconstructed video data that is the same to reconstructed video data generated by the encoder system in a feedback path. Due to errors (both run time and design) in the encoder system, the decoder system and/or in a transmission path, the decoder system might generate incorrectly reconstructed video data. The encoded video bitstream does not contain any information about the video data reconstructed in the feedback path of the encoder system that could be used to check for correctness of the decoding process of the decoder system.

A software-based encoder system will generate reconstructed video data the same way as would be reconstructed with a software-based decoder system if both the encoder system and the decoder system use the same software. The video data reconstructed by a software-based decoder system is compared with the original video data received by the software-based encoder system to determine and report an achieved video quality. Some conventional software-based encoder systems also generate a reconstructed video data file (data reconstructed the same way as would be reconstructed by a decoder system). The encoded video bitstream is then decoded with a software-based decoder system producing a similar reconstructed video data file. The two files are compared and any mismatches reported.

Some conventional real-time encoder systems internally compute and report an achieved video quality. Conventional real-time video testing devices are available that compare two uncompressed video signals (i.e., the original video fed to the encoder system and the decoded video from the decoder system) and report a video quality. However, the conventional real-time video testing devices are very expensive and hard to operate. Conventional real-time video quality measuring devices are also available that work only with the decoded video. The decoded video-only measuring devices judge an overall visual video quality based an amount of artifacts in the decoded video. The decoded video-only measuring devices are also very expensive and cannot report a degradation level caused by the encoding process since no reference exists to compare with the decoded video.

A process of tuning a quality using the software-based codecs and the reconstructed video data can be very time and resource consuming since the reconstructed (i.e., uncompressed) video data uses a significant amount of storage space. The reported video quality from real-time encoder systems is not transmitted in the encoded video stream and thus is not available on the decoder system side. The lack of information causes difficulties in correlating the video and the reported quality with a picture level accuracy for different picture types and/or during transition periods.

A verification of the reconstruction processes has difficulties similar to the video quality process. An amount of storage space needed for long sequences of reconstructed video data is significant. A verification with real-time encoders is often difficult since conventional real-time encoders do not output the internally reconstructed video data.

SUMMARY OF THE INVENTION

The present invention concerns a method for processing an input signal. The method generally comprises the steps of (A) extracting a compressed signal and a first checksum from the input signal, (B) generating a decompressed signal by decompressing the compressed signal, (C) calculating a second checksum for the decompressed signal and (D) generating a result by comparing the first checksum with the second checksum.

The objects, features and advantages of the present invention include providing a method and/or apparatus that may (i) insert peak signal-to-noise ratio values for encoded video pictures into an encoded bitstream, (ii) insert video reconstruction data cyclic redundancy check or checksum information into the encoded bitstream, (iii) report peak signal-to-noise ratio values extracted from the encoded bitstream at a decoding side, (iv) report the cyclic redundancy check or checksum information at the decoding side, (v) provide a reliable and robust error detection method for verified data and/or (vi) provide a simple error detection method optimized for software implementation.

BRIEF DESCRIPTION OF THE DRAWINGS

These and other objects, features and advantages of the present invention will be apparent from the following detailed description and the appended claims and drawings in which:

FIG. 6 is a diagram of an example format byte in the payload.

DETAILED DESCRIPTION OF THE PREFERRED EMBODIMENTS

Figure 1:
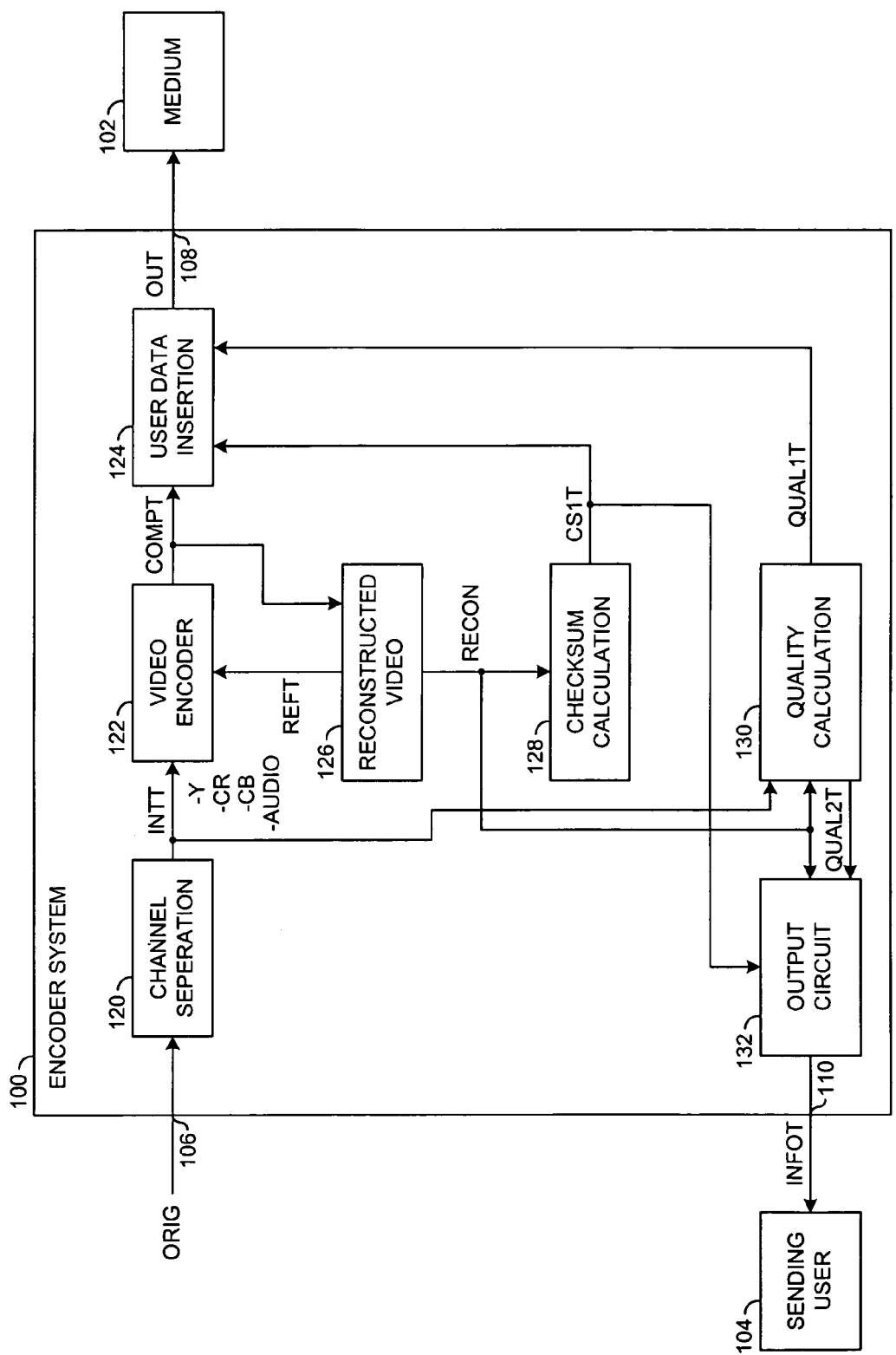
FIG. 1 is a block diagram of an example implementation of an encoder system in accordance with a preferred embodiment of the present invention.

Referring to FIG. 1, a block diagram of an example implementation of a system 100 is shown in accordance with a preferred embodiment of the present invention. The system 100 may be implemented as an encoder system or circuit. The encoder system 100 may interface with a medium 102 and a sending user 104. A signal (e.g., ORIG) may be received at an input 106 of the encoder system 100. A signal (e.g., OUT) may be presented at an output 108 of the encoder system 100 to the medium 102. A signal (e.g., INFOT) may be presented at an output 110 of the encoder system 100 to the sending user 104. The medium 102 may be implemented as a transmission medium and/or a storage medium.

The signal ORIG may represent an original signal received by the encoder system 100 for compression. The signal ORIG may be implemented as one or more video, audio and/or data signals. As illustrated by the example in FIG. 1, the signal ORIG may be implemented as a composite signal simultaneously carrying luminance, chrominance and possibly audio information.

The signal OUT may be implemented as an output signal. The signal OUT may represent the signal ORIG in a compressed/encoded format. The signal OUT may be implemented as a digital bitstream. In one embodiment, the signal OUT may be generally compliant with an International Organization for Standardization/International Electrotechnical Commission 14496-10 standard and/or an International Telecommunication Union-Telecommunications Standardization Sector Recommendation H.264. Hereafter, the ISO/IEC 14496-10 standard and the ITU-T recommendation H.264 may be generally referred to as an "H.264/MPEG4-AVC standard". The signal OUT may be compliant with other standards such as an MP3 standard, AC3 standard, an Advanced Audio Coding standard and the like.

The signal INFOT may be implemented as one or more information signals at a transmitting end of the medium 102. The signal INFOT may transfer or present a reconstructed version of the signal ORIG to the sending user 104. Furthermore, the signal INFOT may transfer or present one or more quality values calculated for the reconstructed video signal to the sending user 104. Still furthermore, the signal INFOT may transfer or present one or more error detection values to the sending user 104.

The encoder system 100 generally comprises a circuit (or module) 120, a circuit (or module) 122, a circuit (or module) 124, a circuit (or module) 126, a circuit (or module) 128, a circuit (or module) 130 and a circuit (or module) 132. The signal ORIG may be received by the circuit 120. The signal OUT may be presented by the circuit 124. The signal INFOT may be presented by the circuit 132. A signal (e.g., INTT) may be transferred from the circuit 120 to the circuits 122 and 130. A signal (e.g., COMPT) may be transferred from the circuit 122 to the circuits 124 and 126. A signal (e.g., REFT) may be transferred from the circuit 126 to the circuit 122. A signal (e.g., RECON) may be transferred from the circuit 126 to the circuits 128 and 132. A signal (e.g., CS1T) may be transferred from the circuit 128 to the circuit 124. Another signal (e.g., QUAL1T) may be transferred from the circuit 130 to the circuit 124. A signal (e.g., QUAL2T) may be transferred from the circuit 130 to the circuit 132.

The circuit 120 may be referred to as a channel separation circuit. Implementation of the channel separation circuit 120 may be optional, depending on the signal ORIG. The channel separation circuit 120 may be operational to separate the signal ORIG into multiple channels or components. For example, a composite video signal ORIG may be separated into a luminance channel (e.g., Y), a first chrominance channel (e.g., CR), a second chrominance channel (e.g., CB) and/or an audio channel presented by the signal INTT. Other channels and/or components may be implemented to meet the criteria of a particular implementation.

The circuit 122 may be referred to as a video encoder circuit. The video encoder circuit 122 may be operational to compress/encode data in the signal INTT to generate the signal COMPT. The compression may use reference video information (e.g., reference frames and/or fields) received via the signal REFT.

The circuit 124 may be referred to as a user data insertion circuit. The user data insertion circuit 124 may be operational to generate the signal OUT to include the compressed information in the signal COMPT, error detection information in the signal CS1T and quality information in the signal QUAL1T. The user data insertion circuit 124 generally resides after an entropy encoding circuit (not shown). In one embodiment, the user data insertion circuit 124 may reside between the entropy encoding circuit and the video encoder circuit 124.

The circuit 126 may be referred to as a reconstructed video circuit. The reconstructed video circuit 126 may be operational to decode/decompress data in the signal COMPT. The decoded/decompressed data may be used to generate the reference information conveyed by the signal REFT. The decoded/decompressed data may also be used to generate the signal RECON.

The circuit 128 may be referred to as a checksum calculation circuit. Implementation of the checksum calculation circuit 128 may be optional. The checksum calculation circuit 128 may be operational to calculate checksum values for units of information within the signal RECON. Each checksum value may be presented in the signal CS1T. Presentation of checksum data may include multiple checksum values substantially simultaneously, one value for each unit of information present within the signal RECON simultaneously. Presentation of the checksum data may also be sequential as new units of information are received via the signal RECON. A unit of information may be specified by the particular application. For example, a unit of information may be a picture, frame, field, sub-picture, block, macroblock or other spatial and/or temporal areas.

The circuit 130 may be referred to as a quality calculation circuit. Implementation of the quality calculation circuit 130 may be optional. The quality calculation circuit 130 may be operational to generate quality values based on the signal INTT as compared with the signal RECON. Each quality value may be presented in the signals QUAL1T and QUAL2T. Presentation of quality data may include multiple quality values substantially simultaneously, one value for each unit of information present within the signal RECON simultaneously. Presentation of the quality data may also be sequential as new units of information are received via the signal RECON. The signal QUAL2T may convey the quality information at full precision. The signal QUAL1T may convey only a smaller but still useful portion of the quality information to save on bandwidth of the signal OUT.

The circuit 132 may be referred to as an output circuit. Implementation of the output circuit 132 may be optional. The output circuit 132 may be operational to generate the signal INFOT based on one or more of the signals RECON, QUAL2T and CS1T.

The signal INTT may be an intermediate signal used to transfer data from the channel separation circuit 120. In general, the signal INTT may carry one channel of the possible several channels at a time. The signal INTT may carry data in a digital form.

The signal COMPT may be referred to as a compressed signal. The compressed signal COMPT may transfer a compressed/encoded version of the signal INTT. Video information within the compressed signal COMPT may be quantized by the video encoder circuit 122.

The signal REFT may be referred to as a reference signal. The reference signal REFT may transfer reference units of information to the video encoder circuit 122 for use in the compression/encoding process. The units of information may include reference video pictures, reference video frames, reference video fields and the like.

The signal CS1T may be referred to as a checksum signal. The checksum signal CS1T may carry error detection information for the reconstructed signal RECON. The error detection information may be in the form of checksum values, cyclic redundancy check (CRC) values, hash operation values, parity values and the like.

The signals QUAL1T and QUAL2T may be referred to as quality signals. The quality signal QUAL2T may carry quality information about the reconstructed signal RECON. The quality signal QUAL1T may be a subset (e.g., a predetermined number of lower bits) of the quality signal QUAL2T.

A commonly used method to generate the video quality data is a peak signal-to-noise ratio (PSNR) process or method. The PSNR method generally compares two sets of data and reports a quality degradation of one data set relative to the other data set. The degradation may be a noise component identified as a difference between the original set of data and the reconstructed set of data. The resulting quality value may be a floating point number with a unit of decibels (dB). A practical range of the quality values may span from 0 to 100 dB. A small quality value generally indicates significant quality degradation. Quality values above 50 dB generally indicate a very good quality. Other methods for generating quality values may be implemented to meet a criteria of a particular application. For example, the quality values may be calculated as a root-mean-square signal-to-noise ratio or a sum of absolute different between the signal INTT and the signal RECON A digital video signal generally has three components, a luminance channel Y and two chrominance channels CR and CB. PSNR data may be reported for each channel separately. Calculations of PSNR values may be performed for video fields or video frames. The encoder system 100 generally calculates the PSNR quality values and inserts the quality values into the video bitstream signal OUT. A video decoder system (FIG. 3) may process the quality values and report the resulting numbers to a receiving user.

A number of different methods are generally available for calculating the signal CS1T as part of a reconstruction process verification, as noted above. The different methods may process a set of data and return a checksum value that describes the data in the set. If any value in the set is altered, the resulting checksum value may be different.

The encoder system 100 may compute checksum values for each reconstructed picture (e.g., frame or field), sub-picture blocks (e.g., slices to macroblocks) and for each luminance and/or chrominance channel. As used herein, "checksum" may be defined generally as any form of error detection and/or error correction data. The checksum values may be inserted into the encoded bitstream signal OUT. A decoder system may execute a duplicate reconstruction process verification on decoded data and compare the results with the checksums received in the encoded bitstream. If the checksums calculated locally by the decoder system and the checksums in the signal OUT are the same, the decoder system may be producing reconstructed video data the same as the encoder system 100.

Figure 2:
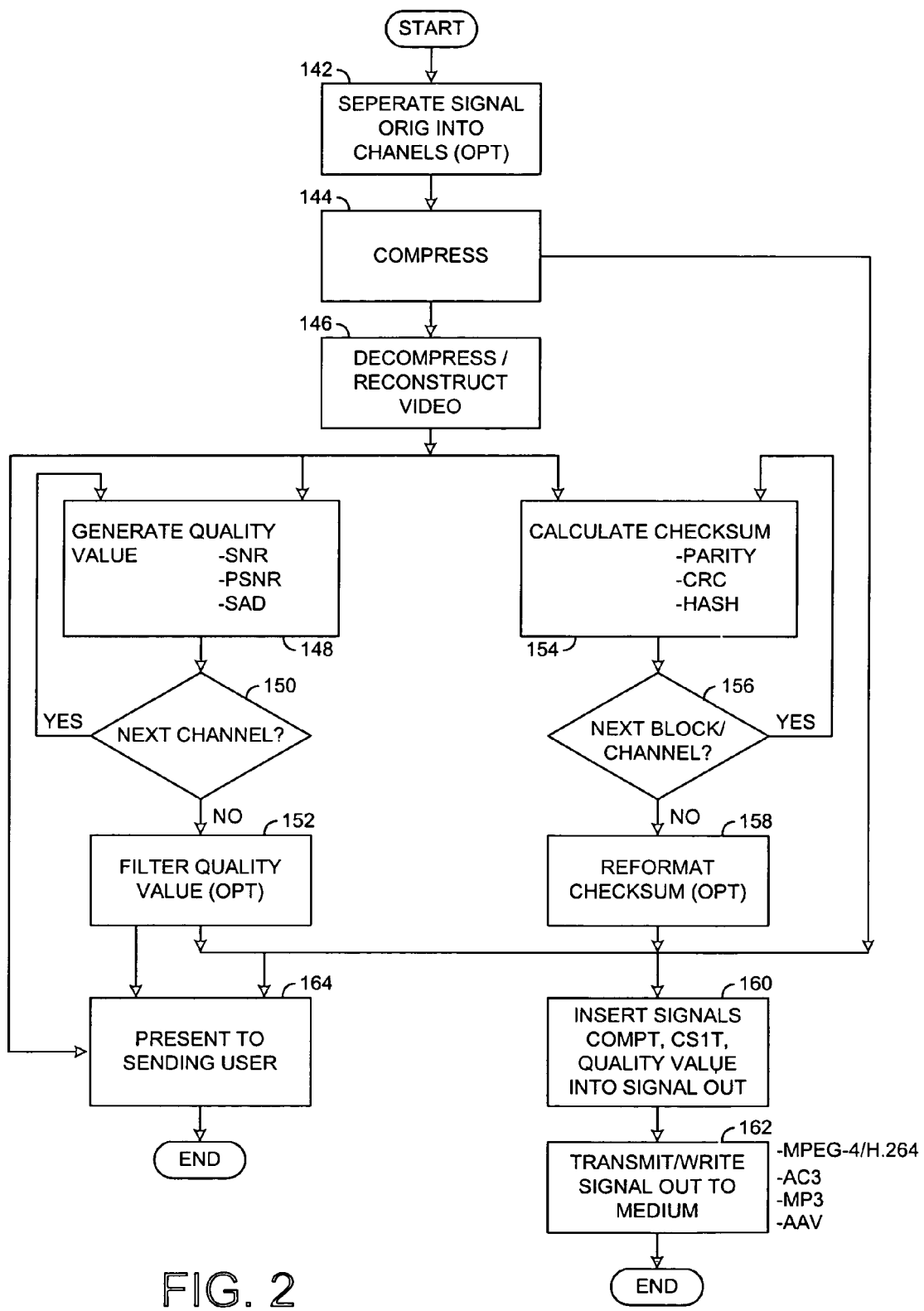
FIG. 2 is a flow diagram of an example method for processing a source signal.

Referring to FIG. 2, a flow diagram of an example method 140 for processing the source signal ORIG is shown. The method 140 generally comprises a step 142, a step 144, a step 146, a step 148, a step 150, a step 152, a step 154, a step 156, a step 158, a step 160, a step 162 and a step 164. The method 140 may implement an operation of the encoder system 100. The method 140 generally illustrates an example process where the signal ORIG is a composite video signal.

The signal ORIG may be separated into multiple channels by the channel separation circuit 120 to create the signal INTT (e.g., step 142). The video encoder circuit 122 may compress the video data in the signal INTT to generate the signal COMPT (e.g., step 144). The reconstructed video circuit 126 may decompress/decode the signal COMPT to generate the reference information in the signal REFT and the reconstructed video in the signal RECON (e.g., step 146). The quality calculation circuit 130 may determine the quality values for a channel in the signal RECON (e.g., step 148). If multiple channels are available, (e.g., the YES branch of step 150), a next channel may be processed by the quality calculation circuit 130. The quality values may be optionally filtered by the quality calculation circuit 130 over time (e.g., step 152). For example, the transmitted quality values in the signal QUAL1T may contain cumulative average values processed since a beginning of the encoding.

The checksum calculation circuit 128 may operate on the signal RECON to generate checksum values in the signal CS1T (e.g., step 154). If additional blocks and/or channels remain to be processed (e.g., the YES branch of step 156), a checksum for a next block or channel may be determined by the checksum calculation circuit 128. The checksum values may be optionally reformatted by the checksum calculation circuit 128 to use fewer bits (e.g., step 158). The checksum values may be optionally calculated and trans-mitted/stored at a sub-picture level and/or macroblock level to localize areas with incorrectly reconstructed video data.

The user data insertion circuit 124 may generate the signal OUT from the signals COMPT, CS1T and QUAL1T (e.g., step 160). The signal OUT may be transmitted/written to the transmission/storage medium 102 (e.g., step 162). The output circuit 132 may generate the signal INFOT from the signals COMPT, CS1T and/or QUAL2T (e.g., step 164). The process 140 may be repeated for each groups of pictures, picture, frame or field in the signal ORIG.

Figure 3:
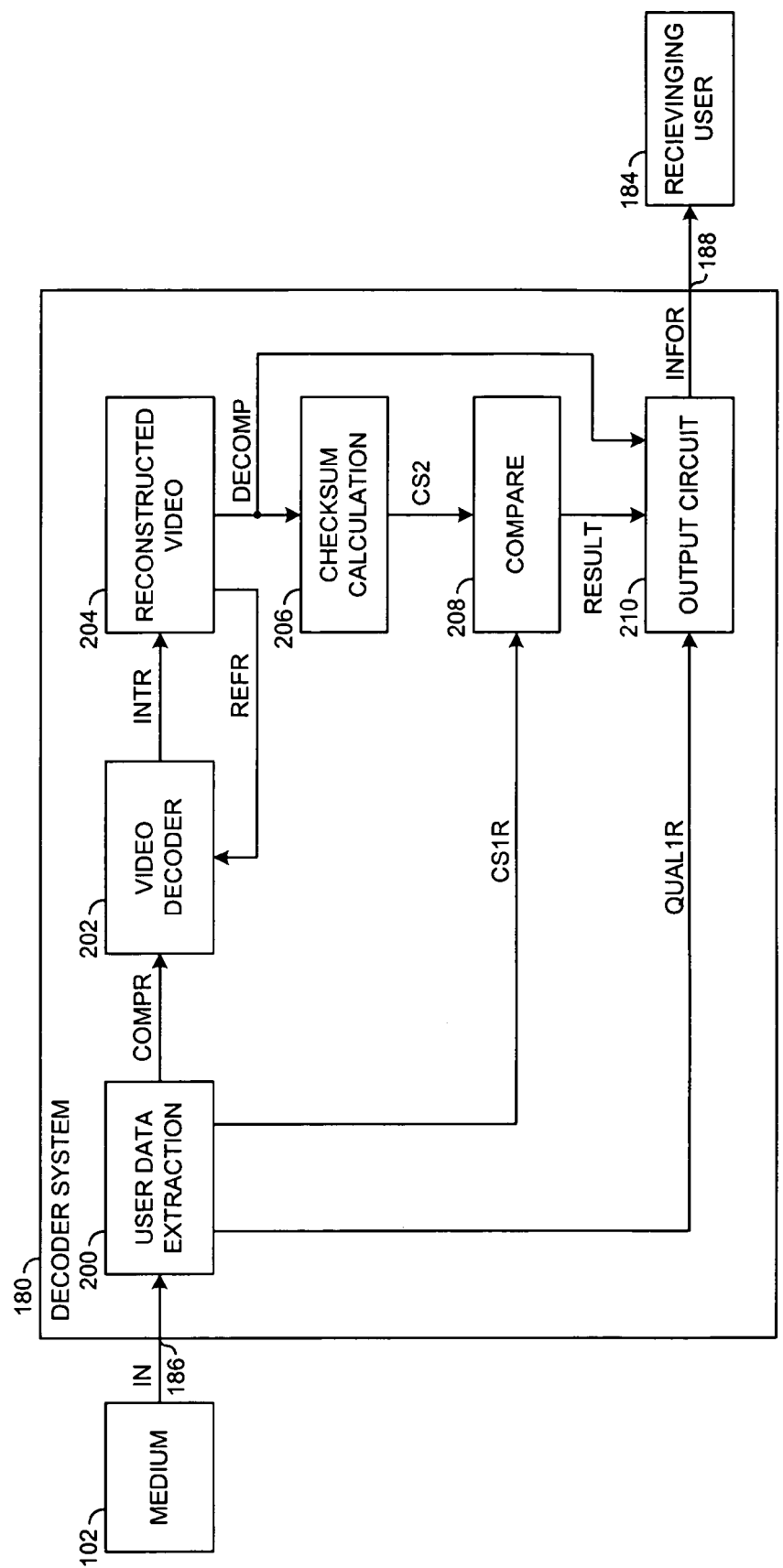
FIG. 3 is a block diagram of an example implementation of a decoder system in accordance with a preferred embodiment of the present invention.

Referring to FIG. 3, a block diagram of an example implementation of a system 180 is shown in accordance with a preferred embodiment of the present invention. The system 180 may be implemented as a decoder system or circuit. The decoder system 180 may interface with the medium 102 and a receiving user 184. A signal (e.g., IN) may be received at an input 186 of the decoder system 180 from the medium 102. A signal (e.g., INFOR) may be presented at an output 188 of the decoder system 180 to the receiving user 184.

The signal IN may be referred to as an input signal. The signal IN may be similar to the signal OUT as transmitted across or stored in the medium 102. The signal IN may represent the signal ORIG in a compressed/encoded format. The signal IN may be implemented as a digital bitstream.

The signal INFOR may be implemented as one or more information signals at a receiving side of the medium 102. The signal INFOR may transfer or present a reconstructed version of the signal ORIG to the receiving user 184. Furthermore, the signal INFOR may transfer or present the quality values carried in the signal QUAL1T to the receiving user 184. Still furthermore, the signal INFOR may transfer or present one or more reconstruction verification comparison results to the receiving user 184.

The decoder system 180 generally comprises a circuit (or module) 200, a circuit (or module) 202, a circuit (or module)

204, a circuit (or module) 206, a circuit (or module) 208 and a circuit (or module) 210. The circuit 200 may receive the signal IN from the medium 102. The circuit 210 may transfer the signal INFOR to the receiving user 184. A signal (e.g., COMPR) may be transferred from the circuit 200 to the circuit 202. A signal (e.g., INTR) may be transferred from the circuit 202 to the circuit 204. A signal (e.g., REFR) may be transferred from the circuit 204 to the circuit 202. A signal (e.g., CS1R) may be transferred from the circuit 200 to the circuit 208. A signal (e.g., QUAL1R) may be transferred from the circuit 200 to the circuit 210. As signal (e.g., DECOMP) may be transferred from the circuit 204 to the circuits 206 and 210. A signal (e.g., CS2) may be transferred from the circuit 206 to the circuit 208. A signal (e.g., RESULT) may be transferred from the circuit 208 to the circuit 210.

The circuit 200 may be referred to as a user data extraction circuit. The user data extraction circuit 200 may be operational to extract the signal COMPR, the quality information in the signal QUAL1R and/or the checksum information in the signal CS1R from the signal IN. The user data extraction circuit 200 generally resides before an entropy decoding circuit (not shown). In one embodiment, the user data extraction circuit 200 may be disposed between the entropy decoding circuit and the video decoder circuit 202.

The circuit 202 may be referred to as a video decoder circuit. The video decoder circuit 202 may be operational to decode/decompress the signal COMPR to generate the signal INTR. The decompression may use reference video information (e.g., reference frames and/or fields) received via the signal REFR.

The circuit 204 may be referred to as a reconstructed video circuit. The reconstructed video circuit 204 may be operational to reconstruct video, audio and/or data in the signal INTR. The reconstructed data may be used to generate the reference information conveyed by the signal REFR. The reconstructed data may also be used to generate the signal DECOMP.

The circuit 208 may be referred to as a checksum calculation circuit. Implementation of the checksum calculation circuit 208 may be optional. The checksum calculation circuit 208 may be operational to calculate checksum values for units of information within the signal DECOMP. Each checksum value may be presented in the signal CS2. Presentation of checksum data may include multiple checksum values substantially simultaneously, one value for each unit of information present within the signal DECOMP simultaneously. Presentation of the checksum data may also be sequential as new units of information are received via the signal DECOMP. The decoder checksum calculation process implemented by the checksum calculation circuit 206 should match the encoder checksum calculation process implemented by the checksum calculation circuit 128.

The circuit 210 may be referred to as an output circuit. Implementation of the output circuit 210 may be optional. The output circuit 210 may be operational to generate the signal INFOR based on one or more of the signals DECOMP, QUAL1R and RESULT.

The signal COMPR may be referred to as a compressed signal. The compressed signal COMPR may be similar to the compressed signal COMPT for an errorless transmission/reception or storage/retrieval process.

The signal INTR may be an intermediate signal used to transfer data from the video decoder circuit 202. In general, the signal INTR may carry one channel of the possible several channels at a time. The signal INTR may carry data in a digital form.

The signal DECOMP may be referred to as a decompressed signal. The decompressed signal DECOMP may be similar to the signal RECON in the encoder system 100 where the decompression process is a good reversal of the compression process.

The signal REFR may be referred to as a reference signal. The reference signal REFR may transfer reference units of information to the video decoder circuit 202 for use in the decompression/decoding process. The units of information may include reference video pictures, reference video frames, reference video fields and the like.

The signal CS2 may be referred to as a checksum signal. The checksum signal CS2 may carry error detection information for the decompressed signal DECOMP. The error detection information may be in the form of checksum values, cyclic redundancy check (CRC) values, hash operation values, parity values and the like.

The signal QUAL1R may be referred to as a quality signal. Implementation of the quality signal QUAL1R may be optional. The quality signal QUAL1R may be similar to the quality signal QUAL1T in an errorless transmission/reception or storage/retrieval process.

The signal RESULT may be referred to as a result signal. Implementation of the result signal may be optional. The result signal RESULT may carry a match indication when the checksum in the signal CS1R matches the checksum in the signal CS2. The result signal RESULT may carry a non-match indication when the checksum in the signal CS1R is different from the checksum in the signal CS2.

Figure 4:
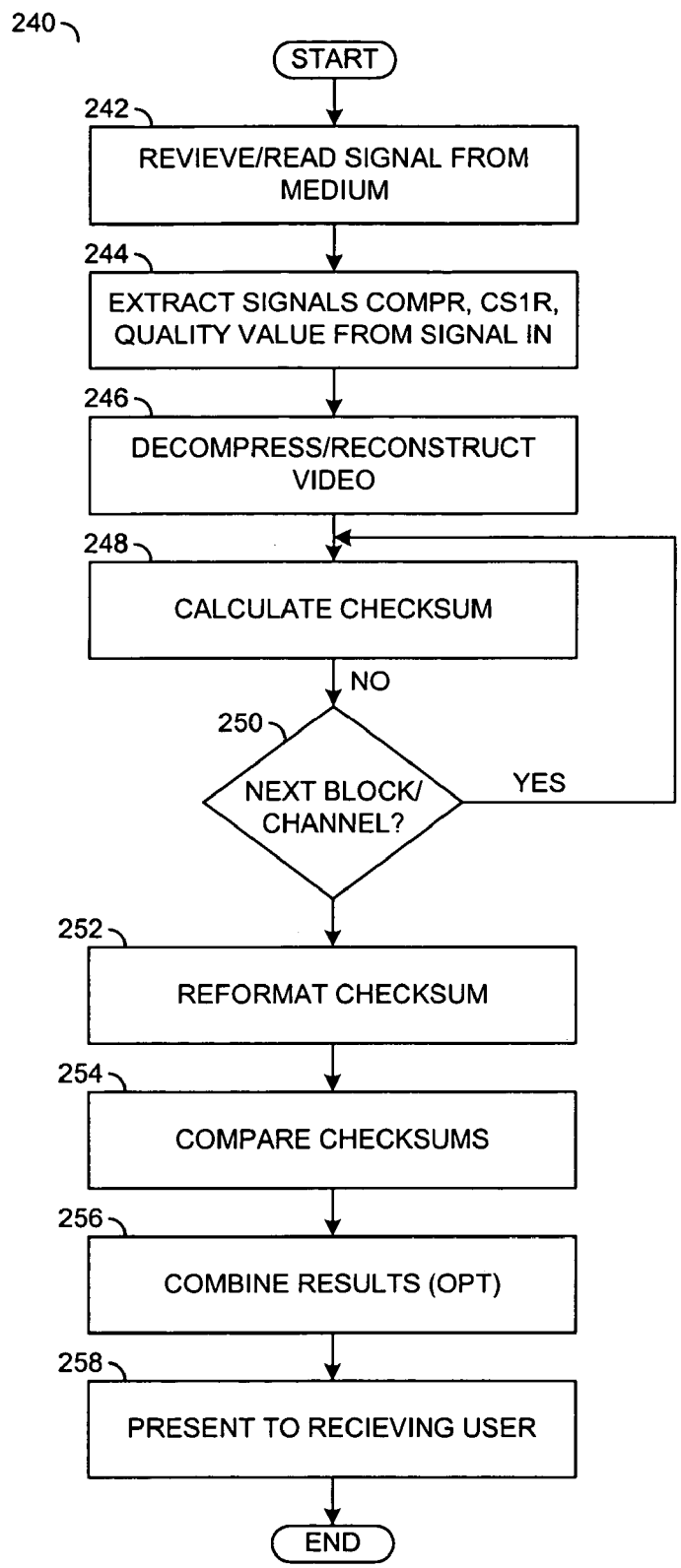
FIG. 4 is a flow diagram of an example method for processing an input signal.

Referring to FIG. 4, a flow diagram of an example method 240 for processing the signal IN is shown. The method 240 generally comprises a step 242, a step 244, a step 246, a step 248, a step 250, a step 252, a step 254, a step 256 and a step 258. The method 240 may implement an operation of the decoder system 180. The method 240 generally illustrates an example process where the signal IN is a video signal.

The user data extraction circuit 200 receive the signal IN from the medium 102 (e.g., step 242). The user data extraction circuit 200 may extract the compressed video in the signal COMPR, the quality information in the signal QUAL1R and/or the checksum values in the signal CS1R from the signal IN (e.g., step 244). Decompression/decoding of the compressed signal COMPR may occur in the video decoder circuit 202 (e.g., step 246). The reconstructed video circuit 204 may also reconstruct the video data into the signal DECOMP (e.g., step 246). A checksum of the reconstructed video data may be calculated by the checksum calculation circuit 206 (e.g., step 248). If another block and/or another channel of the video data is available (e.g., the YES branch of step 250), the checksum calculation circuit 206 may generate additional checksums (e.g., step 248).

The checksum values may be reformatted by the checksum calculation circuit 206 before transfer via the signal CS2 (e.g., step 252). The reformatting may eliminate a predetermined number of higher order bits from the calculated checksum values to match a format of the checksum values in the signal CS1R. The compare circuit 208 may compare the checksum values in the signal CS2 to the checksum values received in the signal CS1R to determine a state (e.g., match or non-match) for the signal RESULTS (e.g., step 254). If multiple results exist for a single picture, the compare circuit 208 may further combine the multiple results into a single result (e.g., step 256). The output circuit 210 may transfer the decompressed video data, results and/or quality information to the receiving user 184 (e.g., step 258). The method 240 may be repeated for each group of pictures, picture, frame or field in the signal IN.

Generation of the checksum values may be accomplished by a variety of methods. An example checksum generation method may be to cumulate absolute differences between two consecutive or adjoining data samples. Implementation of the example checksum generation method may be provided in both the checksum calculation circuit 128 operating on the reconstructed signal RECON and the checksum calculation circuit 206 operating on the decompressed signal DECOMP. The example checksum generation method may be described by the following pseudo code:

```
For a one-dimensional data array:
sum = data[0];
for (i=1; i<size; i++)
    sum = sum + abs(data[i] – data[i–1]);
For a two-dimensional data array:
sum = 0;
for (y=0; y<height; y++)
{
    sum = sum + data[y][0];
    for (x=1; x<width; x++)
        sum = sum + abs(data[y][x] – data[y][x–1]);
}
``` where a one-dimensional and/or two-dimensional data array may represent a unit of information (e.g., predetermined number of consecutive data samples) being processed and the absolute value function y=abs(x) may be defined as follows:

if$(x<0)y=-x;$ otherwise y=x.

The checksum values generated in the encoder system 100 may be attached to the transmitted data in the signal OUT to the medium 102. The decoder system 180 may perform the same checksum generation operation as the encoder system 100 to verify the reliability of the data received in the signal IN from the medium 102.

Because the above checksum generation method cumulates the absolute differences, the method is generally sensitive to data corruption. The checksum generation method may use little extra memory for a software implementation. Implementing the above method may be very effective on an Intel® Pentium® CPU architecture using an MMX® extension where 8 or 16 data samples may be processed using a single instruction. (Intel®, Pentium® and MMX® are trademarks of Intel Corporation, Santa Clara, Calif.) The multiple sample processing attribute generally makes the checksum generation method suitable for real-time software systems running on the Pentium® architecture. For example, the above method may be applied on the reconstructed data on an encoder side to verify reliability on the decoder side in a video encode-decode system.

Other error detection methods may be implemented to meet the criteria of a particular application. For example, a CRC method or a parity method may be implemented in the checksum calculation circuits 128 and 206. The CRC method is generally used for cases involving sensitive error detection capabilities. The parity method is generally a simple method that cumulates all values of the tested array into a single value.

Figure 5:
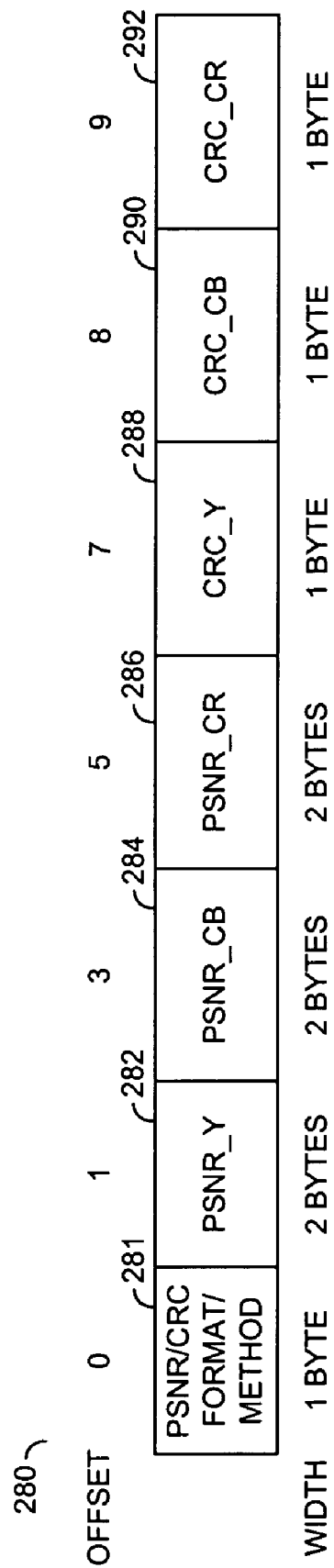
FIG. 5 is a diagram of an example implementation of a format for a payload used to carry video quality and checksum data in a bitstream.

Referring to FIG. 5, a diagram of an example implementation of a format for a payload 280 used to carry the video quality and checksum data in a bitstream is shown. The payload 280 generally comprises a field 281, a field 282, a field 284, a field 286, a field 288, a field 290 and a field 292. Both the video quality and the checksum (e.g., video reconstruction verification) data may be stored in the same payload message. A single message is generally generated for each encoded picture, frame or field of the video data. In an example implementation, the payload 280 may have a size of ten bytes.

A format/method of the PSNR/CRC information may be signal in the field 281 along with the PSNR/CRC data. An example implementation of the PSNR/CRC format/method byte may be illustrated in FIG. 6. An upper four bits (e.g., bits 4–7) may signal the format of the PSNR data. A lower four bits (e.g., bits 0–3) may signal the format of the CRC data.

Quality data for a luminance channel (e.g., PSNR_Y), a first chrominance channel (e.g., PSNR_CB) and a second chrominance channel (PSNR_CR) may be carried in the fields 282, 284 and 286, respectively. The fields 282, 284 and 286 may have offsets of one bytes, three bytes and five bytes, respectively, from the start of the package 280. Each of the fields 282, 284 and 286 may have a length of two bytes.

Checksum data for the luminance channel (e.g., CRC_Y), the first chrominance channel (e.g., CRC_CB) and the second chrominance channel (CRC_CR) may be carried in the fields 288, 290 and 292, respectively. The fields 288, 290 and 292 may have offsets of seven bytes, eight bytes and nine bytes, respectively, from the start of the package 280. Each of the fields 288, 290 and 292 may have a length of one byte.

In the example implementation, the PSNR (quality) values may be transmitted as unsigned 16-bit values obtained by equation 1 as follow:

$$PSNR=\text{Round}(500.0*PSNR) \qquad \text{Eq. (1)}$$

A precision of the PSNR values after rounding may be 0.002 dB. Full precision PSNR values may be used, but would result in a higher bitrate overhead than if first rounded.

The methods for the checksum calculations generally return an unsigned 32-bit value. Reformatting of the checksum values may result in only the eight least significant bits being transmitted/stored by the encoder system 100 and compared in the decoder system 180. The eight least significant bits generally have a highest sensitivity for error detection. The full 32-bits values could be used, but a higher bitrate overhead may result.

An advantage of the present invention may be that the quality values for the reconstructed video data embedded into the encoded bitstream may numerically describe a video quality on the decoder side with minimum extra resources implemented in the decoder system 180. Presentation of the video quality information generally allows the receiving user 184 to monitor the video quality for different video contents and/or different encoder settings to easily correlate the reported numerical quality values with the displayed video images and/or audio sounds. The checksum data for the reconstructed video data that is embedded in the encoded bitstream generally allows the decoder system 180 to verify a correctness of the video reconstruction and report any errors to the receiving user 184. Both quality and reconstruction reporting features discussed above may be particularly useful during a codec development phase. The PSNR quality data generally allows developers (e.g., sending user 104) to tune tools and settings in the encoder system 100.

Furthermore, the checksum data may allow an automated verification of the entire encoding 140-medium 102-decoding 240 processes.

The function performed by the flow diagrams of FIGS. 2 and 4 may be implemented using a conventional general purpose digital computer programmed according to the teachings of the present specification, as will be apparent to those skilled in the relevant art(s). Appropriate software coding may readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which may be used to program a computer to perform a process in accordance with the present invention. The storage medium may include, but is not limited to, any type of disk including floppy disk, optical disk, CD-ROM, and magneto-optical disks, ROMs, RAMs, EPROMS, EEPROMS, Flash memory, magnetic or optical cards, or any type of medium suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for processing an input signal, comprising the steps of:
   (A) extracting a compressed signal and a first checksum from said input signal;
   (B) generating a decompressed signal by decompressing said compressed signal;
   (C) calculating a second checksum for said decompressed signal; and
   (D) generating a result by comparing said first checksum to said second checksum, wherein said second checksum comprises a plurality of checksums, one each for at least a luminance channel, a first chrominance channel and a second chrominance channel of said decompressed signal.

2. The method according to claim 1, wherein step (C) comprises the sub-step of:
   calculating said second checksum for a sub-picture of video in said decompressed signal.

3. The method according to claim 1, wherein step (C) comprises the sub-step of:
   calculating said second checksum for a macroblock of video in said decompressed signal.

4. The method according to claim 1 wherein said decompressed signal comprises an audio signal.

5. The method according to claim 1, wherein said input signal is compliant with at least one of an International Organization for Standardization/International Electrotechnical Commission 14496-10 standard and an International Telecommunication Union-Telecommunications Standardization Sector Recommendation H. 264 accounting for said first checksum.

6. A method for processing an input signal, comprising the steps of:
   (A) extracting a compressed signal and a first checksum from said input signal;
   (B) generating a decompressed signal by decompressing said compressed signal;
   (C) calculating a second checksum for said decompressed signal;
   (D) generating a result by comparing said first checksum to said second checksum;
   (E) extracting a quality value from said input signal, (i) said quality value indicating a correlation between an original signal and a reconstructed signal and (ii) said reconstructed signal being generated by decompressing said compressed signal; and
   (F) transferring said decompressed signal, said quality value and said result to a user.

7. The method according to claim 6, wherein (i) said input signal comprises a digital video bitstream in an encoded form, (ii) said quality value comprises a peak signal-to-noise ratio, (iii) said first checksum comprises a cyclic redundancy check and (iv) said result indicates one of a match and a non-match between said first checksum and said second checksum.

8. The method according to claim 6, wherein said second checksum comprises a plurality of checksums, one each for at least a luminance channel, a first chrominance channel and a second chrominance channel of said decompressed signal.

9. A method for processing an input signal, comprising the steps of:
   (A) extracting a compressed signal and a first checksum from said input signal;
   (B) generating a decompressed signal by decompressing said compressed signal;
   (C) calculating a second checksum for said decompressed signal by summing each absolute difference of two consecutive data samples over a predetermined number of said consecutive data samples within said decompressed signal; and
   (D) generating a result by comparing said first checksum to said second checksum.

10. A method for processing an input signal, comprising the steps of:
    (A) extracting a compressed signal and a quality value from said input signal, (i) said quality value indicating a correlation between an original signal and a reconstructed signal and (ii) said reconstructed signal being generated by decompressing said compressed signal;
    (B) generating a decompressed signal by decompressing said compressed signal; and
    (C) transferring said decompressed signal and said quality value to a user.

11. The method according to claim 10, wherein said quality value comprises a signal-to-noise ratio having a noise component based on a difference between said original signal and said reconstructed signal.

12. The method according to claim 10, wherein said quality value comprises a sum of absolute differences between said original signal and said reconstructed signal.

13. The method according to claim 10, wherein said quality value comprises a plurality of values, one each for at least a luminance channel, a first chrominance channel and a second chrominance channel of said original signal.

14. The method according to claim 10, wherein said input signal is compliant with at least one of an International Organization for Standardization/International Electrotechnical Commission 14496-10 standard and an International Telecommunication Union-Telecommunications Standardization Sector Recommendation H. 264 accounting for said quality value.

15. The method according to claim 10, further comprising the steps of:
   extracting a first checksum from said input signal;
   calculating a second checksum for said decompressed signal;
   generating a result by comparing said first checksum to said second checksum; and
   transferring said result to said user.

16. The method according to claim 15, wherein (i) said input signal comprises a digital video bitstream in an encoded form, (ii) said quality value is a peak signal-to-noise ratio, (iii) said first checksum comprises a cyclic redundancy check and (iv) said result indicates one of a match and a non-match between said first checksum and said second checksum.

17. A method for processing an original signal, comprising the steps of:
   (A) generating a compressed signal, by compressing said original signal;
   (B) generating a reconstructed signal by decompressing said compressed signal;
   (C) calculating at least one of (i) a first checksum for said reconstructed signal and (ii) a quality value indicating a correlation between said original signal and said reconstructed signal;
   (D) generating an output signal comprising said compressed signal and said at least one of said first checksum and said quality value; and
   (E) transferring said quality value to a user.

18. A method for processing an original signal, comprising the steps of:
   (A) generating a compressed signal by compressing said original signal;
   (B) generating a reconstructed signal by decompressing said compressed signal;
   (C) calculating at least one of (i) a first checksum for said reconstructed signal and (ii) a quality value indicating a correlation between said original signal and said reconstructed signal; and
   (D) generating an output signal comprising said compressed signal and said at least one of said first checksum and said quality value, wherein said first checksum comprises a plurality of checksums, one each for at least a luminance channel, a first chrominance channel and a second chrominance channel of said original signal.

19. The method according to claim 17, wherein said first checksum covers a sub-picture of video in said reconstructed signal.

20. The method according to claim 17, wherein said first checksum covers a macroblock of video, in said reconstructed signal.

21. The method according to claim 17, wherein (i) said original signal comprises a video signal, (ii) said quality value comprises a peak signal-to-noise ratio and (iii) said first checksum comprises a cyclic redundancy check.

22. The method according to claim 17, wherein said original signal comprises an audio signal.

23. The method according to claim 17, wherein said output signal is compliant with at least one of an International Organization for Standardization/International Electrotechnical Commission 14496-10 standard and an International Telecommunication Union-Telecommunications Standardization Sector Recommendation H. 264 accounting for said quality value and said first checksum.

24. A method for processing an original signal, comprising the steps of:
   (A) generating a compressed signal by compressing said original signal;
   (B) generating a reconstructed signal by decompressing said compressed signal;
   (C) calculating at least one of (i) a first checksum for said reconstructed signal and (ii) a quality value indicating a correlation between said original signal and said reconstructed signal, wherein said first checksum is calculated by summing each absolute difference of two consecutive data samples over a predetermined number of said consecutive data samples within said reconstructed signal; and
   (D) generating an output signal comprising said compressed signal and said at least one of said first checksum and said quality value.

25. The method according to claim 24, further comprising the step of:
   transferring said quality value to a user.

* * * * *